(12) United States Patent
Daemen et al.

(10) Patent No.: US 7,809,141 B2
(45) Date of Patent: Oct. 5, 2010

(54) CIPHERING BY BLOCKS OF THE CONTENT OF A MEMORY EXTERNAL TO A PROCESSOR

(75) Inventors: Joan Daemen, Overpelt (BE); Gilles Van Assche, Brussels (BE); Guido Marco Bertoni, Carnate (IT)

(73) Assignees: STMicroelectroics S.r.l., Agrate Brianza (MI) (IT); Proton World International N.V., Zaventem (BE)

( * ) Notice: Subject to any disclaimer, the term of this patent is extended or adjusted under 35 U.S.C. 154(b) by 1164 days.

(21) Appl. No.: 11/175,978

(22) Filed: Jul. 6, 2005

(65) Prior Publication Data
US 2006/0008084 A1    Jan. 12, 2006

(30) Foreign Application Priority Data
Jul. 6, 2004    (FR) .................................. 04 51458

(51) Int. Cl.
*H04L 9/00*    (2006.01)
(52) U.S. Cl. ......................................... 380/264; 380/37
(58) Field of Classification Search ................ 380/37, 380/264, 255, 259
See application file for complete search history.

(56) References Cited

U.S. PATENT DOCUMENTS

| 4,149,035 | A | * | 4/1979 | Frutiger ........................ 380/36 |
|---|---|---|---|---|
| 4,278,837 | A |   | 7/1981 | Best |
| 4,319,079 | A | * | 3/1982 | Best ............................ 713/190 |
| 4,465,901 | A | * | 8/1984 | Best ............................ 713/190 |
| 6,021,201 | A | * | 2/2000 | Bakhle et al. ................ 713/189 |
| 6,061,449 | A |   | 5/2000 | Candelore et al. |
| 7,472,285 | B2 |  | 12/2008 | Graunke et al. |
| 2003/0198344 | A1 | | 10/2003 | Courcambeck et al. |
| 2004/0028224 | A1 | * | 2/2004 | Liardet et al. ................. 380/37 |
| 2004/0136529 | A1 |   | 7/2004 | Rhelimi et al. |
| 2006/0253708 | A1 | * | 11/2006 | Bardouillet et al. .......... 713/176 |

OTHER PUBLICATIONS

French Search Report from French Patent Application No. 04/51458, filed Jul. 6, 2004.

* cited by examiner

*Primary Examiner*—Kimyen Vu
*Assistant Examiner*—John B King
(74) *Attorney, Agent, or Firm*—Lisa K. Jorgenson; William R. McClellan; Wolf, Greenfield & Sacks, P.C.

(57) ABSTRACT

A method and an element for ciphering with an integrated processor data to be stored in a memory, including applying to each data block to be ciphered a ciphering algorithm which is a function of at least one key specific to the integrated circuit, and before applying the ciphering algorithm thereto, combining the data block to be ciphered with the result of a function of the storage address of the ciphered block in the memory, and/or of combining the key with the result of a function of the storage address of the ciphered block in the memory and of a digital quantity different from the ciphering key.

21 Claims, 2 Drawing Sheets

CIPHERING BY BLOCKS OF THE CONTENT OF A MEMORY EXTERNAL TO A PROCESSOR

BACKGROUND OF THE INVENTION

1. Field of the Invention

The present invention generally relates to the ciphering or encryption of data, of programs, or more generally of digital codes to be stored in one or several memories, external to an integrated processor in charge of exploiting these codes.

2. Discussion of the Related Art

An example of application of the present invention relates to the ciphering of executable programs downloaded by a device (computer, video or audio data reader, device provided with a microprocessor for executing downloadable programs, etc.) in which these programs are to be stored. The downloading may, for example, use the Internet. More specifically, the present invention relates to programs or data for which it is desired to prevent an unauthorized user from accessing and exploiting them.

Reference will be made hereafter to the term "data" to designate any digital code, be it executable programs or data processed by these programs.

"External to the integrated processor" means, according to the present invention, external to a so-called secure area within which is a central processing unit communicating with the outside of this secure area over one or several buses. The memory is then connected to this or these bus(es) and is thus external to the integrated processor.

FIG. 1 illustrates, partially and very schematically, the structure of a system with a microprocessor and an external memory to which the present invention applies. A so-called secure area 1 within which is located a CPU 2 communicating via one or several buses 3 with an external memory 4 (EXT MEM) is defined. Memory 4 generally is a non-sequential (random or not) access memory. Area 1 is, for example, the microprocessor or, more generally, one or several integrated data processing circuits defining an area within which it is considered that the processed data are not likely to be pirated. In practice, secure area 1 is most often formed of a single integrated circuit chip, external memory 4 being another chip. Processor 2 is associated, in the secure area, with an internal memory 5 (INT MEM) also considered as being secure and exploits a cache memory 6 (CACHE) used as an input-output interface with bus 3.

The ciphering to which the present invention applies relates to that of any data transiting on bus(es) 3, between memory 4 and central unit 2 or more generally area 1. This ciphering consists of coding the data stored by means of a key known by the integrated processor. For example, this key is transmitted thereto by an asymmetrical or symmetrical ciphering process from a distant system providing the program, so that the processor stores it in a protected internal area (for example, memory 5) and uses it to decrypt the downloaded program and/or to cipher the data in the external memory.

The present invention more specifically relates to the case of data which, when stored in the external memory, are ciphered by means of a key which depends on the integrated circuit and which is different from one chip to another, in some cases after personalization. However, the ciphering is independent from the actual data in that it is not necessary to know the data preceding or following those under ciphering to be capable of performing this ciphering.

An example of a known solution to cipher the content of a memory external to a processor is described in U.S. patent application No. 2003-0198344. This solution consists of dividing the data into blocks and of continuously ciphering each data block by means of a sequence combining a key specific to the integrated circuit and an initialization vector changing for each data block.

FIG. 2 very schematically illustrates in the form of blocks such a solution. This solution is based on the use of a pseudo-random generator 10 (SEGEN) providing a ciphering sequence SE of a data block P by means of an XOR-type gate 11. Gate 11 provides a ciphered result C, that is, a block P ciphered by means of sequence SE. Sequence SE provided by generator 10 is based on an internal key K corresponding to a key specific to the microprocessor and on an initialization vector IV provided by a generator 12 (IVGEN). Generator 10 is pseudo-random in that, for a given key K, it always provides the same sequence SE for a same initialization vector IV. Magnitudes K and IV are exploited by a pseudo-random number generation algorithm (block 10) and are binary words, the sizes of which depend on the desired security in terms of numbers of possible combinations. Sequence SE is a binary word, the size of which depends on the size of the blocks to be ciphered. The flow of data blocks C is stored in memory 4 (MEM). Initialization vector IV generated by generator 12 is stored in memory 4 at the same time as encrypted block C (CRYPT DATA) coming from gate 11, to be able to associate, with each stored block, an initialization vector specific thereto. What has been described hereabove corresponds to a write phase (high portion of FIG. 2, WRITE) in memory 4 (MEM).

To decipher (low portion of FIG. 2, READ) data read from memory 4, the same pseudo-random generator 10 of sequences SE and the same XOR gate 11 are used. Generator 10 receives on the one hand key K internal to the integrated circuit (processor) and on the other hand the initialization vector IV corresponding to block C to be deciphered, read from memory 4.

A solution such as illustrated in FIG. 2 corresponds to a solution described in the above-mentioned U.S. patent and enables the ciphered data to be ciphered by a key specific to the integrated circuit chip processing them.

A first problem of conventional solutions of the type described in this patent application is linked to the need to store the initialization vectors. Such storage takes space (be it external or internal to circuit 1).

Another problem is linked to the so-called collision risk with the method used to generate initialization vectors IV of sequence generator SE. Indeed, the probability to be in the presence of two identical initialization vectors is a function of the size of word IV generated by generator 12. However, increasing the length of the random sequence increases the circuit cost. In fact, for a same ciphering algorithm (block 10), the ciphering security lies on the size of the initialization vector.

WO-A-02/0778025 provides a ciphering result that is a function of the ciphering key, the data and its address in the memory.

EP-A-0 908 810 provides masking, upstream from the ciphering, data blocks with their respective addresses in the memory.

These solutions both make an initialization vector dependent on the address of the block to be ciphered and avoid the storage of such a vector in the memory. However, the initialization vector is then determinable (it is no longer random), and that is prejudicial to the security of the ciphering.

SUMMARY OF THE INVENTION

The present invention aims at overcoming the disadvantages of known methods for ciphering the content of a memory external to a processor by means of a key specific to the processor or to the integrated circuit and of an initialization vector that is a function of the memory address of the block to be ciphered.

The present invention especially aims at providing a solution which is compatible with a ciphering by blocks.

To achieve these and other objects, the present invention provides a method for ciphering with an integrated processor data to be stored in a memory, comprising applying to each data block to be ciphered a ciphering algorithm which is a function of at least one key specific to the integrated circuit, and before applying the ciphering algorithm thereto, of combining the data block to be ciphered with the result of a function of the storage address of the ciphered block in the memory, and/or of combining said key with the result of a function of the storage address of the ciphered block in the memory and of a digital quantity different from the ciphering key.

According to an embodiment of the present invention, said function is linear.

According to an embodiment of the present invention, said function IVGEN is a linear combination of bits $A_i$ of the address A with bit vectors $R_i$ of said digital quantity, according to the following formula:

$$IVGEN(A) = \sum_{i=1}^{n} (A_i * R_i).$$

According to an embodiment of the present invention, said bits of the digital quantity are dependent on said key.

According to an embodiment of the present invention, said bits of the digital quantity are randomly generated.

According to an embodiment of the present invention, said function is a reversible function of the address.

According to an embodiment of the present invention, the memory is divided at least into sections in which each ciphered data block is addressable by an index, said function taking into account both the address of the section and the block index.

The present invention also provides a method for deciphering a data block, comprising, before applying thereto a deciphering algorithm, combining the ciphered data block with the result of said function of the address, and a digital quantity different from the ciphering key.

The present invention also provides an electronic assembly comprising at least one memory external to an integrated circuit provided with a processor, comprising means for ciphering data to be written into the memory.

The present invention also provides a smart card, comprising said assembly.

The foregoing objects, features, and advantages of the present invention will be discussed in detail in the following non-limiting description of specific embodiments in connection with the accompanying drawings.

DETAILED DESCRIPTION

Figure 1:
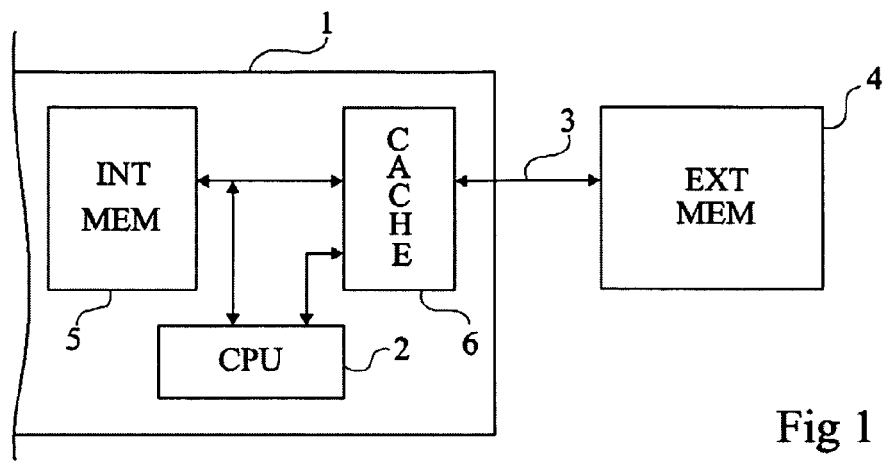
FIGS. 1 and 2, previously described, are intended to show the state of the art and the problem to solve.

The same elements have been designated with the same reference numerals in the different drawings. For clarity, only those elements and steps which are necessary to the understanding of the present invention have been shown in the drawings and will be described hereafter. In particular, the ciphering algorithm based on the key internal to the circuit has not been described in detail; the present invention being compatible with any conventional block ciphering algorithm (for example, AES, DES).

A feature of an embodiment of the present invention is to make the initialization vector used for the ciphering not only dependent on the address (whatever is its representation) at which a data word must be stored in the memory but also on a digital quantity different from the key used by the ciphering algorithm. Thus, the storage of this initialization vector is avoided, the address of the data word in the memory being known, but the initialization vector is not determinable. The digital quantity is a quantity considered as secret as it is preferably made dependent on the ciphering key or randomly generated inside the circuit. Thus, this quantity is unknown from an hacker who does not know the key.

Preferably, the memory is divided into sections each comprising several words each of a length corresponding, preferably, to the length of a ciphering block. Each section then has an address A and each block position in a section has an index I on which the initialization vector is also dependent. Knowing the address and the index, it is possible to locate the data block (the word) in the memory.

Figure 2:
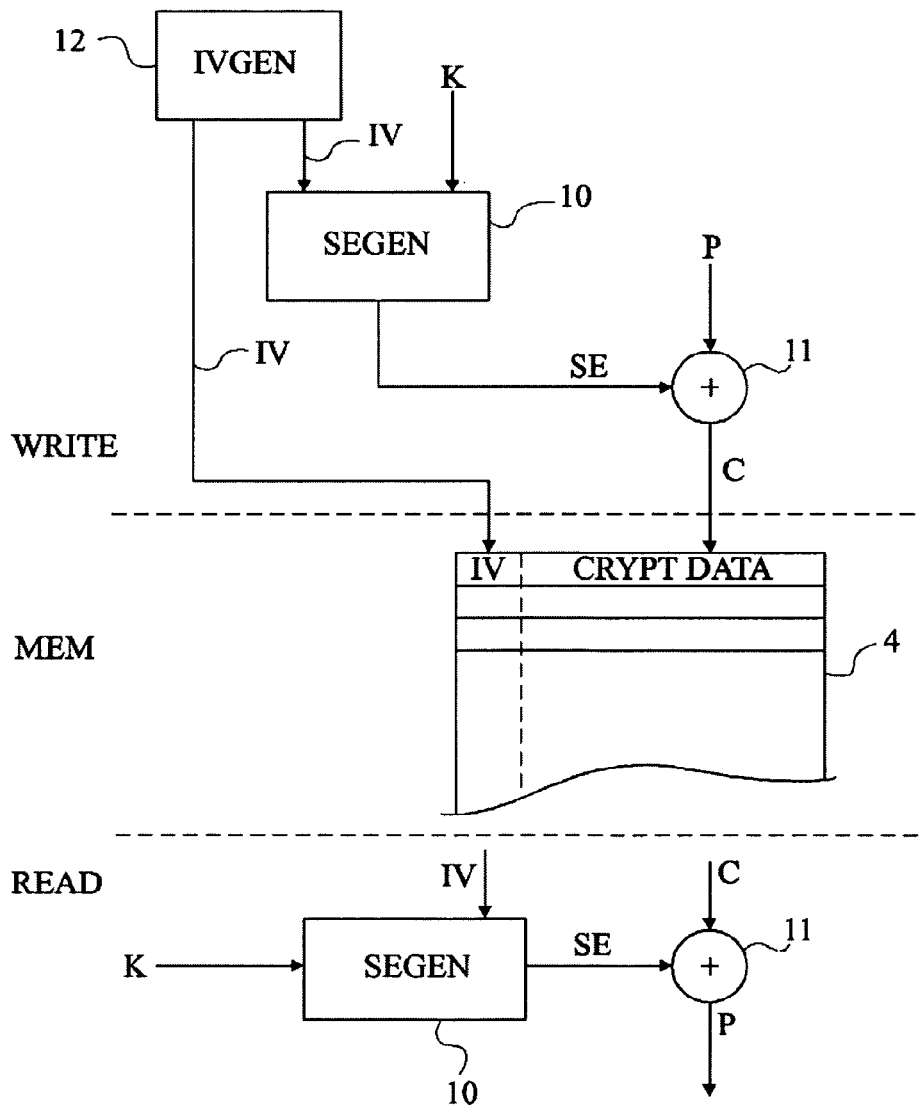

According to the present invention, the ciphering is a ciphering performed by blocks, conversely to the continuous ciphering of the known solution of FIG. 2. In a block cipher, a ciphering algorithm (for example, of DES or AES type) is applied on the data block while in a stream cipher, a ciphering sequence (SE, FIG. 2) which masks the data flow is generated.

Executing a block cipher has the advantage that a collision is less prejudicial to security. Indeed, in the case of a stream cipher, a problem occurs as soon as an initialization vector is identical for two ciphered data, since the cipher sequence is independent from the data.

Conversely, in the case of a block cipher, even if the initialization vector of two blocks is the same, the initial data can be determined as identical but they cannot be known. Accordingly, a block cipher enables withstanding collisions in addresses conditioning, according to the present invention, the initialization vectors. Further, by making the initialization vector dependant on a secret digital quantity different from the ciphering key, the invention reduces the risk of collision.

Figure 3:
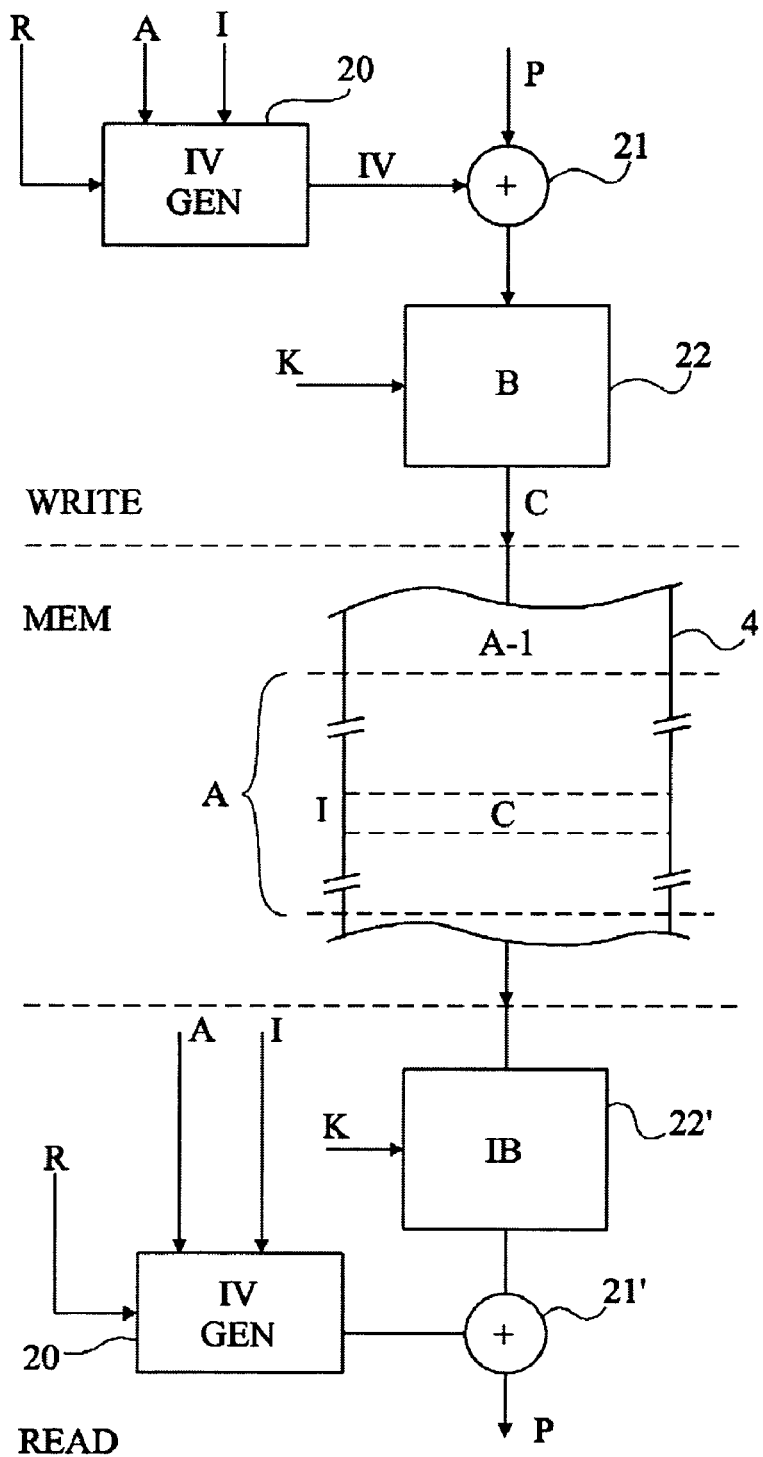
FIG. 3 illustrates an embodiment of the present invention.

FIG. 3 very schematically illustrates an embodiment of the method according to the present invention. This drawing shows, in the form of blocks, the elements or functions of the ciphering circuit of an integrated processor. The practical implementation of this ciphering circuit may be either a hardware realization (wired logic) or a software realization (program executed by the integrated processor).

As previously, a generator 20 provides an initialization vector conditioning the ciphering. However, initialization vector IV is here combined (for example, by bit-to-bit addition, amounting to an XOR combination—block 21) with a data block P to be ciphered, before applying the actual ciphering algorithm B (block 22), based on a key K specific to the integrated circuit. It being a block cipher, the size of vector IV is identical to the size of a block P. At the output of block 22, a ciphered data block C to be stored in memory 4 (MEM) is obtained. External memory 4 is divided into blocks, the individual sizes of which correspond to the sizes of a block of the ciphering algorithm (for example, 64 bits for a DES-type algorithm, 128 bits for an AES-type algorithm, etc.).

According to the present invention, vector IV is a function of the storage address of the ciphered data block and of a digital quantity R known by the integrated circuit This quantity R is a bit vector having a size identical to the size of vector IV. Here, addresses A are addresses of sections of memory 4 each containing several blocks locatable by an index I. Generator 20 then takes account of addresses A and I.

In a simplified embodiment, address A of the section represents the most significant bits (MSB) of the complete address and index I represents the least significant bits (LSB) of the complete address. As an alternative, any combination function may be used, provided that it is a reversible function (that A and I allow reconstructing the full address and vice versa).

Word flow C is stored in memory 4 (MEM). According to the present invention, no other value needs being stored therein. Accordingly, the space required in memory 4 is considerably reduced.

What has been described hereabove corresponds to a write phase (high portion of FIG. 3, WRITE) in memory 4 (MEM). To decipher (low portion of FIG. 3, READ) data C read from memory 4, a block 22' ($IB_K(IV)$) implementing the inverse function of that performed by block 22, which receives on the one hand key K internal to the integrated circuit (processor) and on the other hand ciphered data block C. The result of block 22' is combined with an initialization vector IV, is used. Vector IV is, according to the present invention, restored based on quantity R, address A of the section and index I known by the processor, for example, by means of the same generator 20 as that of the ciphering.

The ciphering amounts to applying, to each data word (block) P, the following formula:

$$C=B_K(P+IVGEN(A,R)),$$

where symbol + designates a bit-to-bit addition (bit-to-bit XOR) and where IVGEN(A, R) corresponds to initialization vector IV, that is, is a function taking into account address A of storage of datum C in memory 4 and of digital quantity R.

If function IVGEN takes into account index I, the ciphering relation becomes:

$$C=B_K(P+IVGEN(A,I,R)).$$

Different functions may be chosen provided that, when applied to a same value (pair address A, quantity R), they always provide the same vector IV, to allow the deciphering. For example, function IVGEN calculates a pseudo-random value based on address A and on quantity R.

According to another example, function IVGEN is itself a function (for example, the ciphering algorithm) for ciphering address A with quantity R. In this case:

$$C=B_K(P+B_R(A)).$$

For the deciphering, value P is obtained again as follows:

$$P=IB_K(C)+IVGEN(A).$$

The exploitation of addresses A and I may be a simple concatenation (for example, address A represents the most significant bits (MSB) of the complete address and index I represents the least significant bits (LSB)), or a more complex function (preferably, reversible, i.e. according to which no information is lost).

Other subdivisions of memory 4 may be taken into account. For example, a region code Z is assigned to subsets of the memory gathering several sections locatable by their address A. Using symbol/to designate a concatenation, the complete ciphering function becomes, for example:

$$C=B_K(P+IVGEN(Z/A/I)).$$

For example, a linear combination of several constants with each of the address bits is performed. This amounts to applying the following formula:

$$IVGEN(A) = \sum_{i=1}^{n}(A_i * R_i),$$

where i designates the rank of the bit of the n-bit word forming address A, values $R_i$ being vectors, for example made of constants generated randomly (for example at the powering) or with key K by respecting, for example, the following relation:

$$R_i=B_K(i).$$

The methods applying the function of the address to the key or to the data can be combined.

It should be noted that the present invention is compatible with any conventional method for providing a key to an integrated processor, since the present invention does not take part in the generation of this key but only exploits it to cipher the data to be stored in an external memory. In particular, several keys may be used within a same circuit and may be chosen, for example, according to the application or to the user. Similarly, the key(s) may be provided to the integrated circuit by any conventional method (public key system, writing upon manufacturing, random generation at power up, etc.).

Examples of ciphering algorithms that may be used for the implementation of the present invention are described in the following publications, their possible adaptation being within the abilities of those skilled in the art based on the functional indications given hereabove:

FIPS PUB 46-3, Data Encryption Standard (DES), 1999;

FIPS PUB 197, Advanced Encryption Standard (AES), 2001.

Of course, the present invention is likely to have various alterations, modifications, and improvements which will readily occur to those skilled in the art. In particular, the practical implementation of the present invention by a hardware or software implementation is within the abilities of those skilled in the art based on the functional indications given hereabove. Further, other ciphering algorithms than those indicated in the present description as an example may be used. Furthermore, the invention is compatible with a chaining of the former ciphered block (CBC) wherein the initialization vector is computed for the first block of a section, the ciphered block being combined with the following block to be ciphered. In this case, a section corresponds to the ciphered block.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for ciphering with an integrated processor data to be stored in a memory, the method comprising:
   combining each data block to be ciphered with a result of a first function of a storage address of the data block in memory and a digital quantity to provide combined data; and
   applying to the combined data a ciphering algorithm which is a second function of at least one key specific to the integrated processor, to obtain a ciphered data block, the digital quantity being different from the at least one key, wherein:
   the storage address of the ciphered data block in the memory is an address A that comprises bits $A_1, \ldots A_n$;
   the digital quantity different from the at least one key comprises bit vectors $R_1, \ldots, R_n$;
   said first function is a function IVGEN that is a linear combination according to the following formula:

$$IVGEN(A) = \sum_{i=1}^{n} (A_i * R_i).$$

2. The method of claim 1, wherein, said bit vectors $R_1, \ldots, R_n$ of the digital quantity are dependent on said at least one key.

3. The method of claim 1, wherein said bit vectors $R_1, \ldots, R_n$ of the digital quantity are randomly generated.

4. The method of claim 1, wherein:
   the memory is divided at least into sections; and
   the ciphered data block is stored in a section of the memory and is addressable by a block index, said first function taking into account both an address of the section of the memory and the block index.

5. A method for deciphering a ciphered data block ciphered according to the method of claim 1, comprising, after applying a deciphering algorithm to the ciphered data block to obtain intermediate data, combining the intermediate data with a result of said first function applied to a storage address of the ciphered data block in the memory and the digital quantity different from the at least one key.

6. An electronic assembly comprising at least one memory external to an integrated circuit provided with a processor, comprising:
   means for combining each data block to be ciphered with a result of a first function of a storage address of the data block in memory and a digital quantity to provide combined data; and
   means for applying to the combined data a ciphering algorithm, which is a second function of at least one key specific to the integrated circuit, to obtain a ciphered data block, the digital quantity being different from the at least one key, wherein:
   the storage address of the ciphered data block in the memory is an address A that comprises bits $A_1, \ldots, A_n$;
   the digital quantity different from the at least one key comprises bit vectors $R_1, \ldots, R_n$; and
   said first function is a function IVGEN that is a linear combination according to the following formula:

$$IVGEN(A) = \sum_{i=1}^{n} (A_i * R_i).$$

7. A smart card, comprising the electronic assembly of claim 6.

8. The electronic assembly of claim 6, wherein the bit vectors $R_1, \ldots, R_n$ of the digital quantity are dependent on the at least one key.

9. The electronic assembly of claim 6, wherein the bit vectors $R_1, \ldots, R_n$ of the digital quantity are randomly generated.

10. The electronic assembly of claim 6, wherein:
    the memory is divided at least into sections; and
    the ciphered data block is stored in a section of the memory and is addressable by a block index, the first function taking into account both an address of the section of the memory and the block index.

11. A method for ciphering data using at least one processor, comprising:
    generating an initialization vector based at least in part on an address in a memory and a digital quantity;
    combining data to be ciphered with the initialization vector to obtain combined data;
    using the at least once processor to apply a ciphering algorithm to the combined data to obtain ciphered data, wherein the ciphering algorithm has as a parameter at least one ciphering key associated with the at least one processor, the digital quantity being different from the at least one ciphering key; and
    storing the ciphered data at the address in the memory, wherein:
    the address is an address A that comprises quantities $A_1, \ldots, A_n$;
    the digital quantity comprises vectors $R_1, \ldots, R_n$;
    the initialization vector is generated using a function IVGEN according to the following formula:

$$IVGEN(A) = \sum_{i=1}^{n} (A_i * R_i).$$

12. The method of claim 11, wherein the initialization vector is generated using a linear function.

13. The method of claim 11, wherein the vectors $R_1, \ldots, R_n$ of the digital quantity are dependent on the at least one ciphering key.

14. The method of claim 11, wherein the vectors $R_1, \ldots, R_n$ of the digital quantity are randomly generated.

15. The method of claim 11, wherein:
    the memory is divided into sections;
    the ciphered data is stored in a section of the memory and is addressable by a block index; and
    the initialization vector is generated based at least in part on an address of the section of the memory and the block index.

16. A method for deciphering ciphered data stored at an address in a memory, comprising:
    generating an initialization vector based at least in part on the address in the memory and a digital quantity;
    using at least one processor to apply a deciphering algorithm to the ciphered data to obtain intermediate data, wherein the deciphering algorithm has as a parameter at least one deciphering key associated with the at least one processor, the digital quantity being different from the at least one deciphering key; and
    combining the intermediate data with the initialization vector, wherein:
    the address is an address A that comprises quantities $A_1, \ldots, A_n$;

the digital quantity comprises vectors $R_1, \ldots, R_n$; and the initialization vector is generated using a function IVGEN according to the following formula:

$$IVGEN(A) = \sum_{i=1}^{n} (A_i * R_i).$$

17. An electronic assembly comprising at least one processor programmed to:
- generate an initialization vector based at least in part on an address in a memory and a digital quantity;
- combine data to be ciphered with the initialization vector to obtain combined data;
- apply a ciphering algorithm to the combined data to obtain ciphered data, wherein the ciphering algorithm has as a parameter at least one ciphering key associated with the at least one processor, the digital quantity being different from the at least one ciphering key; and
- store the ciphered data at the address in the memory, wherein:
- the address is an address A that comprises quantities $A_1, \ldots, A_n$;
- the digital quantity comprises vectors $R_1, \ldots, R_n$; and
- the initialization vector is generated using a function IVGEN according to the following formula:

$$IVGEN(A) = \sum_{i=1}^{n} (A_i * R_i).$$

18. The electronic assembly of claim 17, wherein the initialization vector is generated using a linear function.

19. The electronic assembly of claim 17, wherein the vectors $R_1, \ldots, R_n$ of the digital quantity are dependent on the at least one ciphering key.

20. The electronic assembly of claim 17, wherein the vectors $R_1, \ldots, R_n$ of the digital quantity are randomly generated.

21. The electronic assembly of claim 17, wherein:
- the memory is divided into sections;
- the ciphered data is stored in a section of the memory and is addressable by a block index; and
- the initialization vector is generated based at least in part on an address of the section of the memory and the block index.

* * * * *

UNITED STATES PATENT AND TRADEMARK OFFICE
CERTIFICATE OF CORRECTION

PATENT NO. : 7,809,141 B2  Page 1 of 1
APPLICATION NO. : 11/175978
DATED : October 5, 2010
INVENTOR(S) : Joan Daemen et al.

It is certified that error appears in the above-identified patent and that said Letters Patent is hereby corrected as shown below:

On the Title page:
Item (73) should read:
Assignee: STMicroelectronics S.r.l. (Agrate Brianza (MI), IT)
           Proton World International N.V. (Zaventem, BE)

Col. 4, line 50 should read:
vector dependent on a secret digital quantity different from Signed and Sealed this Twenty-third Day of November, 2010

David J. Kappos
*Director of the United States Patent and Trademark Office*